(12) United States Patent
Yanai et al.

(10) Patent No.: US 7,593,076 B2
(45) Date of Patent: Sep. 22, 2009

(54) OPTICAL DEVICE AND METHOD FOR MANUFACTURING OPTICAL DEVICE

(75) Inventors: Hiroaki Yanai, Shiojiri (JP); Toshiaki Hashizume, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 329 days.

(21) Appl. No.: 11/427,566

(22) Filed: Jun. 29, 2006

(65) Prior Publication Data
US 2007/0201134 A1 Aug. 30, 2007

(30) Foreign Application Priority Data

Feb. 24, 2006 (JP) ............................. 2006-047881
Apr. 26, 2006 (JP) ............................. 2006-121653

(51) Int. Cl.
*G02F 1/1335* (2006.01)
(52) U.S. Cl. ...................................... 349/114; 349/122
(58) Field of Classification Search .................. 349/56, 349/61, 62, 64, 84, 96, 99, 117, 121, 122, 349/123, 132; 359/483, 485
See application file for complete search history.

(56) References Cited

U.S. PATENT DOCUMENTS

| | | | | |
|---|---|---|---|---|
| 4,181,752 A | * | 1/1980 | Martens et al. | 427/516 |
| 4,587,313 A | * | 5/1986 | Ohta et al. | 526/75 |
| 4,731,282 A | * | 3/1988 | Tsukagoshi et al. | 428/220 |
| 4,740,657 A | * | 4/1988 | Tsukagoshi et al. | 174/88 R |
| 4,931,347 A | * | 6/1990 | Slovinsky et al. | 428/192 |
| 5,555,476 A | * | 9/1996 | Suzuki et al. | 349/95 |
| 5,612,801 A | * | 3/1997 | Winker | 349/119 |
| 5,659,411 A | * | 8/1997 | Nito et al. | 349/117 |
| 5,880,800 A | * | 3/1999 | Mikura et al. | 349/122 |
| 6,436,214 B1 | | 8/2002 | Murata | |
| 6,577,375 B1 | * | 6/2003 | Umehara et al. | 349/158 |
| 6,642,989 B2 | * | 11/2003 | Umehara et al. | 349/158 |
| 6,669,797 B2 | | 12/2003 | Murata | |
| 6,726,965 B2 | * | 4/2004 | Ito et al. | 428/1.2 |
| 6,784,962 B2 | * | 8/2004 | Sumida et al. | 349/122 |
| 7,126,754 B2 | | 10/2006 | Yamaoka et al. | |
| 7,198,831 B2 | * | 4/2007 | Watanabe et al. | 428/1.5 |
| 7,244,476 B2 | * | 7/2007 | Sumida et al. | 428/1.5 |
| 7,301,594 B2 | * | 11/2007 | Yu et al. | 349/120 |
| 2003/0119961 A1 | * | 6/2003 | Oshima et al. | 524/431 |
| 2004/0032546 A1 | * | 2/2004 | Ito | 349/96 |
| 2005/0023549 A1 | * | 2/2005 | Gardner et al. | 257/99 |
| 2005/0122455 A1 | * | 6/2005 | Watanabe et al. | 349/122 |
| 2006/0055855 A1 | * | 3/2006 | Duz et al. | 349/117 |
| 2007/0076150 A1 | * | 4/2007 | Hale et al. | 349/117 |
| 2007/0077372 A1 | * | 4/2007 | Chung | 428/1.5 |
| 2007/0085951 A1 | * | 4/2007 | Hale et al. | 349/117 |
| 2008/0014373 A1 | * | 1/2008 | Muramatsu et al. | 428/1.1 |

FOREIGN PATENT DOCUMENTS

| | | |
|---|---|---|
| CN | 1279403 A | 1/2001 |
| CN | 1388387 A | 1/2003 |
| CN | 1510442 A | 7/2004 |
| CN | 1662832 A | 8/2005 |

(Continued)

*Primary Examiner*—Frank G Font
*Assistant Examiner*—Peter Radkowski
(74) *Attorney, Agent, or Firm*—Oliff & Berridge, PLC (57) ABSTRACT

An optical device includes a polarizer having a polarizing layer, a first light-transmissive substrate bonded on one surface of the polarizing layer of the polarizer, and a second light-transmissive substrate bonded on the other surface of the polarizing layer of the polarizer. The first light-transmissive substrate and the second light-transmissive substrate are made of an inorganic material.

14 Claims, 2 Drawing Sheets

FOREIGN PATENT DOCUMENTS

| | | |
|---|---|---|
| JP | A-07-020317 | 1/1995 |
| JP | A-2000-112022 | 4/2000 |
| WO | WO 2005/033754 A1 | 4/2005 |
| WO | WO 2005/111667 A2 | 11/2005 |

* cited by examiner

OPTICAL DEVICE AND METHOD FOR MANUFACTURING OPTICAL DEVICE

BACKGROUND

1. Technical Field

The present invention relates to an optical device and a method for manufacturing an optical device.

2. Related Art

As a polarizer used for an optical apparatus, a polarizer having a two-layer structure or three-layer structure is typically known in which a supporting layer made of triacetylcellulose (TAC) for securing mechanical strength and the like is stacked on one side or both sides of a polarizing layer made of polyvinylalcohol (PVA), for example, as disclosed in JP-A-7-20317. A supporting layer made of TAC has excellent transparency, uniformity, flatness and the like and has very little anisotropy due to molecular orientation. Therefore, it is preferably used as a supporting layer for supporting a polarizing layer.

Meanwhile, in a traditional polarizer, since light that is not transmitted through a polarizing layer is internally absorbed, a large quantity of heat may be generated, causing a rise in the temperature of the polarizer. Therefore, there is a problem that the polarizer is degraded, lowering the polarization characteristic of the polarizer.

Thus, as an optical device to solve such a problem, an optical device having a thermally conductive light-transmissive substrate bonded on both sides of a polarizer (outer side than the supporting layer of the polarizer) is disclosed, for example, in JP-A-2000-112022. With this optical device, heat generated in the polarizer is radiated outside of the system via the thermally conductive light-transmissive substrate, thus making it possible to restrain a rise in the temperature of the polarizer. Therefore, it is possible to restrain degradation of the polarizer and hence lowering of the polarization characteristic of the polarizer.

However, as the light sources in the recent optical apparatuses have increasingly higher luminance, a larger quantity of heat is generated in the polarizer and the temperature of the polarizer tends to rise easily. Therefore, the problem of degradation of the polarizer and lowering of the polarization characteristic of the polarizer due to the rise in the temperature of the polarizer tends to occur easily.

SUMMARY

Thus, the invention is made in view of the foregoing circumstances. An advantage of some aspects of the invention is to provide an optical device in which lowering of the polarization characteristic of a polarizer due to a rise in the temperature of the polarizer can be restrained as compared with the traditional techniques. Another advantage of some aspects of the invention is to provide a method for manufacturing such an excellent optical device.

To provide such optical device and manufacturing method, the inventors made every effort to find the causes of the lowering of the polarization characteristic of the polarizer due to the rise in the temperature of the polarizer with respect to the polarizer described in JP-A-7-20317 and the optical device described in JP-A-2000-112022, and consequently have found that the supporting layer constituting the polarizer is exposed outside and that the supporting layer exists on the light incident side and/or light exiting side of the polarizing layer constituting the polarizer, as the causes.

Specifically, in the polarizer described in JP-A-7-20317, since the supporting layer constituting the polarizer is exposed outside, the supporting layer tends to expand and deform easily because of the rise in the temperature of the polarizing layer and the entry of moisture from outer air. Therefore, irregularity occurs in the molecular orientation in the light incident-side and light exiting-side supporting layers. As a result, the polarization characteristic of the polarizer is lowered. In this case, if irregularity occurs in the molecular orientation in the light incident-side supporting layer, this irregularity in the molecular orientation is directly detected on the polarizing layer. Therefore, the polarization characteristic of the polarizer is lowered very much.

On the other hand, in the optical device described in JP-A-2000-112022, since the thermally conductive light-transmissive substrate is bonded on both sides of the polarizer, the supporting layer is prevented from being exposed outside. Therefore, it is possible to restrain expansion and deformation of the supporting layer due to the entry of moisture from outer air.

However, since the supporting layer usually has lower thermal conductivity than the light-transmissive substrate, even if the thermally conductive light-transmissive substrate is bonded on both sides of the polarizer, heat generated in the polarizing layer cannot be easily transmitted to the light-transmissive substrate because of interposition of the supporting layer. Therefore, the heat generated in the polarizing layer is not radiated and causes the rise in the temperature of the polarizing layer. Thus, double refraction due to thermal distortion occurs in the supporting layer and the polarization characteristic of the polarizer is lowered.

Thus, in view of the foregoing findings, the inventors have reached a conclusion that, by using a polarizer having a structure in which no supporting layer exists on the light incident side and the light exiting side of a polarizing layer, it is possible to restrain the lowering of the polarization characteristic of the polarizer due to the rise in the temperature of the polarizer, compared with the traditional techniques. The inventors have thus completed the invention.

An exemplary optical device according to an aspect of the invention can comprise a polarizer having a polarizing layer, a first light-transmissive substrate bonded on one surface of the polarizing layer of the polarizer, and a second light-transmissive substrate bonded on the other surface of the polarizing layer of the polarizer. The first light-transmissive substrate and the second light-transmissive substrate are made of an inorganic material.

Therefore, in the optical device according to the first aspect of the invention, since the polarizer has no supporting layer, there is no irregularity in molecular orientation in a supporting layer. In short, there is no double refraction due to thermal distortion in a supporting layer, and therefore the polarization characteristic of the polarizer is not lowered very much by a rise in the temperature of the polarizer.

Also, since the exemplary optical device according to an aspect of the invention has the polarizer having the polarizing layer and also has the first light-transmissive substrate and the second light-transmissive substrate bonded on both sides of the polarizing layer, it is possible to efficiently transfer heat generated in the polarizing layer to the first light-transmissive substrate and the second light-transmissive substrate without using a supporting layer. Therefore, it is possible to restrain the rise in the temperature of the polarizer (polarizing layer).

Thus, the exemplary optical device according to an aspect of the invention is an optical device in which lowering of the polarization characteristic of the polarizer due to the rise in the temperature of the polarizer can be restrained, compared with the traditional techniques.

Also, since the exemplary optical device according to an aspect of the invention has the structure in which the polarizing layer is held from its both sides by the first light-transmissive substrate and the second light-transmissive substrate, predetermined mechanical strength can be achieved.

Usually, a supporting layer used for a polarizer is an organic member. Therefore, it has low thermal conductivity and the temperature tends to rise easily. Also, under high-temperature high-humidity conditions, the supporting layer made of an organic member is degraded and its molecular orientation becomes irregular. Thus, when the polarizer having the supporting layer made of an organic member is degraded, the light transmittance of the supporting layer is lowered and the polarization characteristic is lowered very much by heat.

However, in the exemplary optical device according to an aspect of the invention, since the polarizer has no supporting layer, such inconvenience does not occur. That is, it is possible to restrain lowering of the light transmittance of the polarizer.

It is preferable that the first light-transmissive substrate, the polarizing layer and the second light-transmissive substrate are bonded on each other with a pressure-sensitive-adhesive or an adhesive, respectively.

Such construction enables restraint of occurrence of surface reflection on the boundary between the respective members and improvement in the light transmittance.

Also, even when the first light-transmissive substrate, the polarizing layer and the second light-transmissive substrate have different coefficients of linear expansion from each other, peeling off of the bonded surfaces between the respective members cannot easily occur, enabling restraint of lowering of long-term reliability.

In the exemplary optical device according to an aspect of the invention, at least one of the first light-transmissive substrate and the second light-transmissive substrate can be made of sapphire or quartz.

Since the light-transmissive substrate made of these materials has excellent thermal conductivity, heat generated in the polarizing layer can be efficiently radiated outside of the system, enabling effective restraint of rise in the temperature of the polarizing layer.

In the exemplary optical device according to an aspect of the invention, at least one of the first light-transmissive substrate and the second light-transmissive substrate can be made of quartz glass, hard glass or other light-transmissive glasses.

Since little double refraction occurs in the light-transmissive substrate made of these materials, lowering of the quality of light fluxes passing through the light-transmissive substrate can be restrained and lowering of the quality of light fluxes incident on the polarizer and light fluxes exiting the polarizer can be restrained. Also, since the light-transmissive substrate made of these materials has a small coefficient of thermal expansion, deformation of the polarizer itself can be restrained by adhering the polarizer, which by nature tends to be elongated and deformed by heat, to the light-transmissive substrate made of the materials having such a small coefficient of thermal expansion.

In the exemplary optical device according to an aspect of the invention, at least one of the first light-transmissive substrate and the second light-transmissive substrate can be made of crystalline glass or sintered body of cubic crystal.

As the axial direction having large thermal expansion in the crystalline glass or sintered body of cubic crystal is aligned with the extending direction of the polarizing layer, thermal deformation of the polarizing layer can be restrained.

As the first light-transmissive substrate and the second light-transmissive substrate, a light-transmissive substrate made of white plate glass, a light-transmissive substrate made of Pyrex (trademark registered), a light-transmissive substrate made of YAG polycrystal, a light-transmissive substrate made of aluminum oxide-nitride and the like can be suitably used, other than the foregoing ones.

In the exemplary optical device according to an aspect of the invention, at least one of the first light-transmissive substrate and the second light-transmissive substrate can be made of a material having an optic axis, and that the first light-transmissive substrate and the second light-transmissive substrate are arranged with respect to the polarizing layer so that the optic axis of the light-transmissive substrate made of the material having the optic axis is substantially parallel or substantially perpendicular to the polarization axis of the polarizing layer.

With such construction, unwanted double refraction that occurs when the optic axis of the light-transmissive substrate made of the material having the optic axis, of the first light-transmissive substrate and the second light-transmissive substrate, is not substantially parallel or substantially perpendicular to the polarization axis of the polarizing layer, is restrained, enabling improvement in the quality of the optical device.

In this description, the "polarization axis of the polarizing layer" refers to the polarization axis of light passing through the polarizing layer.

In the exemplary optical device according to an aspect of the invention, the first light-transmissive substrate and the second light-transmissive substrate can be made of the same material.

Such construction enables reduction in the manufacturing cost. Also, since their coefficients of linear expansion coincide with each other, distortion due to internal stress can be reduced.

An exemplary method for manufacturing an optical device according to an aspect of the invention is adapted for manufacturing an optical device including a polarizing layer and a first light-transmissive substrate and a second light-transmissive substrate that are made of an inorganic material having an optic axis, The method includes applying a pressure-sensitive-adhesive to one surface of the polarizing layer of the polarizer, bonding the one surface of the polarizing layer and the first light-transmissive substrate with the pressure-sensitive-adhesive, applying an adhesive to the other surface of the polarizing layer of the polarizer, and bonding the polarizing layer and the second light-transmissive substrate with the adhesive, in this order.

Therefore, with the exemplary method for manufacturing an optical device according to an aspect of the invention, since an optical device is manufactured by using a polarizer having no supporting layer, there is no irregularity in the molecular orientation in the supporting layer. In short, since double refraction due to thermal distortion in a supporting layer does not occur, the polarization characteristic of the polarizer is not lowered very much by a rise in the temperature of the polarizing layer.

Also, with the exemplary method for manufacturing an optical device according to an aspect of the invention, since an optical device having the first light-transmissive substrate and the second light-transmissive substrate bonded on both sides of the polarizing layer can be manufactured, it is possible to efficiently transfer heat generated in the polarizing layer to the first light-transmissive substrate and the second light-transmissive substrate without using a supporting layer.

Therefore, it is possible to restrain the rise in the temperature of the polarizer (polarizing layer).

Thus, the exemplary method for manufacturing an optical device according to an aspect of the invention enables manufacture of an optical device in which lowering of the polarization characteristic of the polarizing layer due to the rise in the temperature of the polarizing layer can be restrained, compared with the traditional techniques.

Also, with the exemplary method for manufacturing an optical device according to an aspect of the invention, since an optical device having a structure in which the polarizing layer is held from its both sides by the first light-transmissive substrate and the second light-transmissive substrate can be manufactured, predetermined mechanical strength can be achieved.

Usually, a supporting layer used for a polarizer is an organic member. Therefore, it has low thermal conductivity and the temperature tends to rise easily. Also, under high-temperature high-humidity conditions, the supporting layer made of an organic member is degraded and its molecular orientation becomes irregular. Thus, when the polarizer having the supporting layer made of an organic member is degraded, the light transmittance of the supporting layer is lowered and the polarization characteristic is lowered very much by heat.

However, with the exemplary method for manufacturing an optical device according to an aspect of the invention, since an optical device is manufactured by using a polarizer having no supporting layer for supporting a polarizing layer, such inconvenience does not occur, That is, it is possible to restrain lowering of the light transmittance of the polarizer.

With the exemplary method for manufacturing an optical device according to an aspect of the invention, since a pressure-sensitive-adhesive is used for bonding the polarizing layer and the first light-transmissive substrate and an adhesive is used for bonding the polarizing layer and the second light-transmissive substrate, alignment of the optic axis of the first light-transmissive substrate and the polarization axis of the polarizing layer, and alignment of the optic axis of the second light-transmissive substrate and the polarization axis of the polarizing layer can be made relatively easily.

In the exemplary method for manufacturing an optical device according to an aspect of the invention, between the bonding the polarizing layer and the first light-transmissive substrate and the application of the adhesive, heat treatment can be performed on the polarizing layer bonded on the first light-transmissive substrate with the pressure-sensitive-adhesive.

By a method, since initial contraction due to heat of the polarizing layer occurs because of the heat treatment, it is possible to prevent damage to the polarizing layer due to thermal stress even when the manufactured optical device is heated.

In the exemplary method for manufacturing an optical device according to an aspect of the invention, in the first bonding, the polarizing layer and the first light-transmissive substrate can be bonded so that the optic axis of the first light-transmissive substrate and the polarization axis of the polarizing layer become substantially parallel or substantially perpendicular to each other, and that in the second bonding, the polarizing layer and the second light-transmissive substrate are bonded so that the optic axis of the second light-transmissive substrate and the polarization axis of the polarizing layer become substantially parallel or substantially perpendicular to each other.

By such a method, unwanted double refraction that occurs when neither the optic axis of the first light-transmissive substrate nor the optic axis of the second light-transmissive substrate is substantially parallel or substantially perpendicular to the polarization axis of the polarizing layer, is restrained, enabling manufacture of an optical device of high quality.

In the exemplary method for manufacturing an optical device according to an aspect of the invention, an ultraviolet hardening adhesive can be used as the adhesive, and the second bonding can include casting ultraviolet rays to the adhesive to harden the adhesive.

By such a method, it is possible to easily manufacture an excellent optical device as described above.

BRIEF DESCRIPTION OF THE DRAWINGS

The invention will be described with reference to the accompanying drawings, wherein like numbers refer to like elements.

DESCRIPTION OF EXEMPLARY EMBODIMENTS

Hereinafter, an optical device and a method for manufacturing an optical device according to some aspects of the invention will be described with reference to Exemplary embodiments shown in the drawings.

Exemplary Embodiment 1

First, the construction of an optical device 1 according to Exemplary embodiment 1 will be described with reference to FIG. 1.

Figure 1:
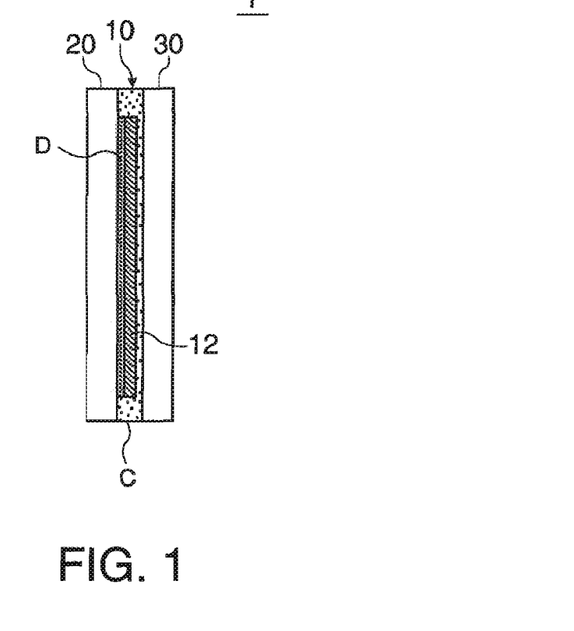
FIG. 1 schematically shows an optical device according to Exemplary embodiment 1.

FIG. 1 schematically shows the optical device 1 according to Exemplary embodiment 1.

The optical device 1 is an optical device having a polarizer 10, a first light-transmissive substrate 20 bonded on one surface of the polarizer 10, and a second light-transmissive substrate 30 bonded on the other surface of the polarizer 10, as shown in FIG. 1.

The polarizer 10 includes a polarizing layer 12. As the polarizing layer 12, a polarizing layer formed by, for example, dyeing polyvinylalcohol (PVA) with iodine or dichroic dye and uniaxially extending this PVA to orient the molecules of the dye in one direction, can be preferably used. The polarizing layer, thus formed, absorbs polarized light in a direction parallel to the uniaxially extending direction and transmits polarized light in a direction perpendicular to the uniaxially extending direction.

The first light-transmissive substrate 20 and the second light-transmissive substrate 30 are made of, for example, sapphire. The first light-transmissive substrate 20 and the second light-transmissive substrate 30 made of sapphire have high thermal conductivity of approximately 40 W/(m*K), very high hardness, and small coefficient of thermal expansion. They are less susceptible to scratches and have high transparency. In the case where inexpensiveness is emphasized while intermediate luminance suffices, light-transmissive substrates made of quartz having thermal conductivity of approximately 10 W/(m*K) may be used as the first light-transmissive substrate 20 and the second light-transmissive substrate 30. The thickness of the first light-transmissive substrate 20 and the second light-transmissive substrate 30 is preferably 0.2 mm or more in view of thermal conductivity, and preferably 2.0 mm or less in view of reduction in the thickness of the optical device.

Both the first light-transmissive substrate 20 and the second light-transmissive substrate 30 have predetermined optic axes.

As shown in FIG. 1, the polarizing layer 12 and the first light-transmissive substrate 20 are bonded on each other via a pressure-sensitive-adhesive layer D, and the polarizing layer 12 and the second light-transmissive substrate 30 are bonded on each other via an adhesive layer C. This restrains occurrence of surface reflection on the boundary between the respective members, and enables improvement in the light transmittance. Even when the polarizing layer 12, the first light-transmissive substrate 20 and the second light-transmissive substrate 30 have different coefficients of thermal expansion from each other, peeling off on the bonding surface between the respective members does not occur easily, and lowering of long-term reliability can be restrained, Antireflection layers, not shown, are formed on the surface of the first light-transmissive substrate 20 that is opposite to the polarizer 10 and on the surface of the second light-transmissive substrate 30 that is opposite to the polarizer 10.

The optical device 1 according to Exemplary embodiment 1 is an optical device having the polarizer 10 including the polarizing layer 12, the first light-transmissive substrate 20 bonded on one surface of the polarizing layer 12 of the polarizer 10, and the second light-transmissive substrate 30 bonded on the other surface of the polarizing layer 12 of the polarizer 10.

Therefore, in the optical device 1 according to Exemplary embodiment 1, since the polarizer 10 has no supporting layer, there is no irregularity in molecular orientation in a supporting layer. In short, there is no double refraction due to thermal distortion in a supporting layer, and therefore the polarization characteristic of the polarizer is not lowered very much by a rise in the temperature of the polarizer 10.

Also, since the optical device 1 according to Exemplary embodiment 1 has the polarizer 10 including the polarizing layer 12 and also has the first light-transmissive substrate 20 and the second light-transmissive substrate 30 bonded on both sides of the polarizing layer 12, it is possible to efficiently transfer heat generated in the polarizing layer 12 to the first light-transmissive substrate 20 and the second light-transmissive substrate 30 without using a supporting layer. Therefore, it is possible to restrain the rise in the temperature of the polarizer 10 (polarizing layer 12).

Thus, the optical device 1 according to Exemplary embodiment 1 is a long-life optical device in which lowering of the polarization characteristic of the polarizer due to the rise in the temperature of the polarizer 10 can be restrained, compared with the traditional techniques.

Also, since the optical device 1 according to Exemplary embodiment 1 has the structure in which the polarizing layer 12 is held from its two sides by the first light-transmissive substrate 20 and the second light-transmissive substrate 30, predetermined mechanical strength can be achieved.

Usually, a supporting layer used for a polarizer is an organic member. Therefore, it has low thermal conductivity and the temperature tends to rise easily. Also, under high-temperature high-humidity conditions, the supporting layer made of an organic member is degraded and its molecular orientation becomes irregular. Thus, when the polarizer having the supporting layer made of an organic member is degraded, the light transmittance of the supporting layer is lowered and the polarization characteristic is lowered very much by heat.

However, in the optical device 1 according to Exemplary embodiment 1, since the polarizer 10 has no supporting layer, such inconvenience does not occur. That is, it is possible to restrain lowering of the light transmittance of the polarizer 10.

In the optical device 1 according to Exemplary embodiment 1, the first light-transmissive substrate 20 and the second light-transmissive substrate 30 are made of sapphire.

Since the light-transmissive substrates made of sapphire have excellent thermal conductivity, heat generated in the polarizer 10 can be efficiently radiated outside of the system, enabling effective restraint of rise in the temperature of the polarizer 10.

In the optical device 1 according to Exemplary embodiment 1, since the first light-transmissive substrate 20 and the second light-transmissive substrate 30 are made of the same material, the manufacturing cost can be reduced. Also, since their coefficients of linear expansion coincide with each other, distortion due to internal stress can be reduced.

Exemplary Embodiment 2

Now, a method for manufacturing an optical device according to Exemplary embodiment 2 will be described with reference to FIGS. 2 and 3.

Figure 2:
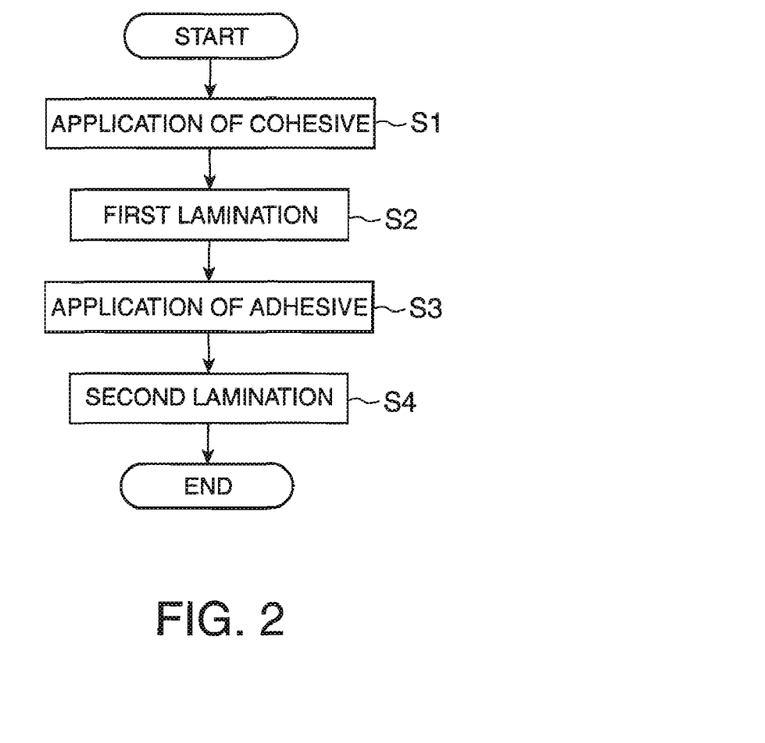
FIG. 2 is a flowchart for explaining a method for manufacturing an optical device according to Exemplary embodiment 2.
Figure 3:
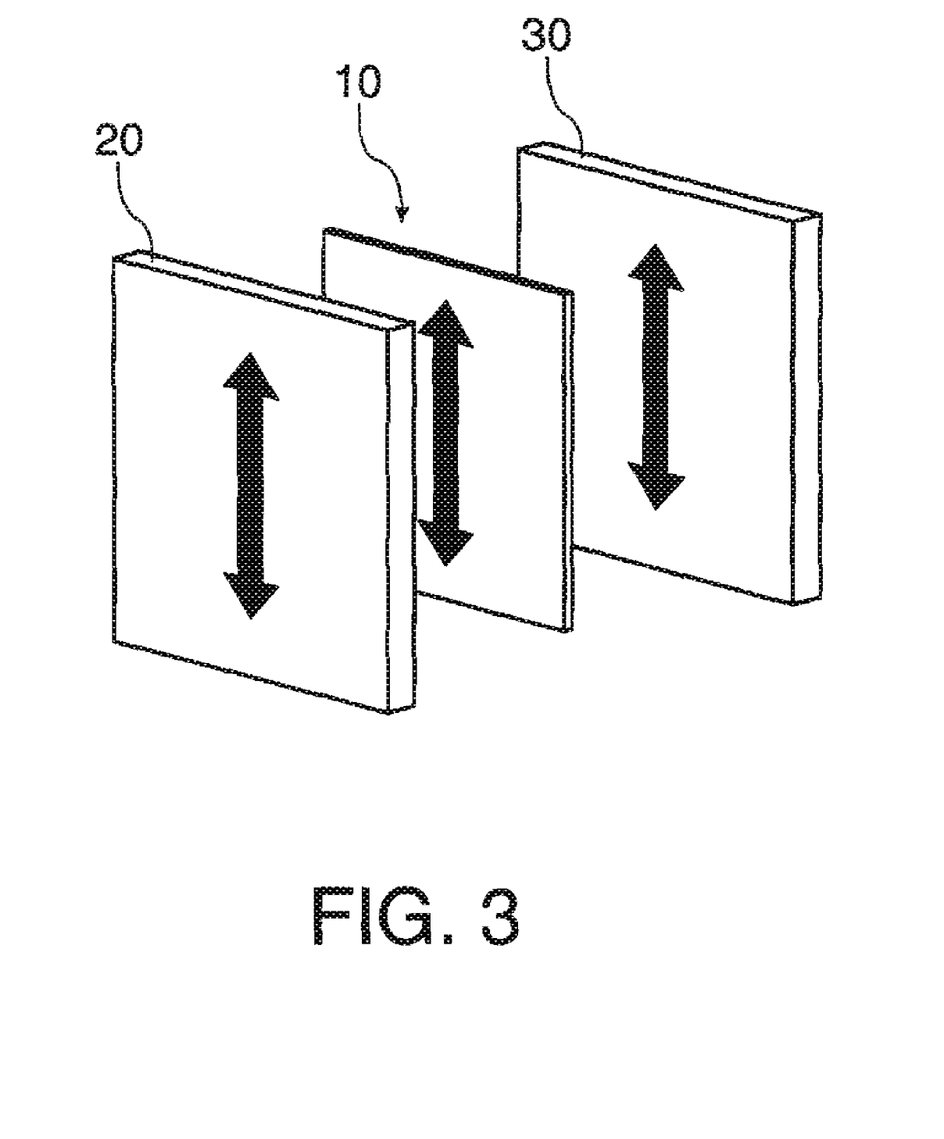
FIG. 3 illustrates the method for manufacturing an optical device according to Exemplary embodiment 2.

FIG. 2 is a flowchart for explaining the method for manufacturing an optical device according to Exemplary embodiment 2. FIG. 3 illustrates the method for manufacturing an optical device according to Exemplary embodiment 2.

The method for manufacturing an optical device according to Exemplary embodiment 2 is adapted for manufacturing the optical device 1 according to Exemplary embodiment 1. In this method, "application of pressure-sensitive-adhesive", "first bonding", "application of adhesive" and "second bonding" are sequentially executed. Hereinafter, each of these processes will be described in order.

Application of Pressure-sensitive-adhesive

First, a pressure-sensitive-adhesive is applied to one surface of the polarizing layer 12 of the polarizer 10 (step S1 in FIG. 2). In this case, for example, an acrylic-based pressure-sensitive-adhesive, urethane-based pressure-sensitive-adhesive or the like can be preferably used as the pressure-sensitive-adhesive.

2. First Bonding

Next, the polarizing layer 12 and the first light-transmissive substrate 20 are bonded on each other with the pressure-sensitive-adhesive (step S2 in FIG. 2). In this case, the polarizing layer 12 and the first light-transmissive substrate 20 are bonded so that the optic axis of the first light-transmissive substrate 20 and the polarization axis of the polarizing layer 12 become substantially parallel to each other (see FIG. 3).

Now, the polarizing layer 12 bonded on the first light-transmissive substrate 20 with the pressure-sensitive-adhesive is left for 0.5 to 10 hours in an environment of a temperature of 80 to 110 degrees Celsius. That is, heat treatment (annealing) is performed on the polarizing layer 12 bonded on the first light-transmissive substrate 20 with the pressure-sensitive-adhesive.

3. Application of Adhesive

Next, an adhesive is applied to the other surface of the polarizing layer 12 of the polarizer 10 and the periphery of the polarizing layer 12 of the polarizer 10 (step S3 in FIG. 2). In this case, an ultraviolet hardening adhesive is used as the adhesive.

4. Second Bonding

Then, the polarizing layer 12 and the second light-transmissive substrate 30 are bonded on each other with the adhesive (step S4 in FIG. 2). In this case, the polarizing layer 12 and the second light-transmissive substrate 30 are bonded so that the optic axis of the second light-transmissive substrate 30 and the polarization axis of the polarizing layer 12 become substantially parallel to each other (see FIG. 3).

Specifically, after the polarizing layer 12 and the second light-transmissive substrate 30 are adhered to each other so that the optic axis of the second light-transmissive substrate 30 and the polarization axis of the polarizing layer 12 become substantially parallel to each other, ultraviolet rays are cast onto the adhesive applied to the polarizing layer 12 by using an ultraviolet irradiator, not shown, thus hardening the adhesive.

By these processes, the optical device 1 according to Exemplary embodiment 1 can be manufactured.

As described above, the method for manufacturing an optical device according to Exemplary embodiment 2 is adapted for manufacturing the optical device 1 and includes the application of the pressure-sensitive-adhesive to apply the pressure-sensitive-adhesive to one surface of the polarizing layer 12 of the polarizer 10, the first bonding to bond the polarizing layer 12 and the first light-transmissive substrate 20 with the pressure-sensitive-adhesive, the heat treatment performed on the polarizing layer 12 bonded on the first light-transmissive substrate 20 with the pressure-sensitive-adhesive, the application of the adhesive to apply the adhesive to the other surface of the polarizing layer 12 of the polarizer 10, and the second bonding to bond the polarizing layer 12 and the second light-transmissive substrate 30 with the adhesive, in this order.

Therefore, with the method for manufacturing an optical device according to Exemplary embodiment 2, it is possible to manufacture the optical device 1 according to Exemplary embodiment 1 easily and accurately. Thus, it is possible to manufacture an optical device having the advantage of the optical device 1 according to Exemplary embodiment 1.

With the method for manufacturing an optical device according to Exemplary embodiment 2, since the pressure-sensitive-adhesive is used for bonding the polarizing layer 12 and the first light-transmissive substrate 20 and the adhesive is used for bonding the polarizing layer 12 and the second light-transmissive substrate 30, alignment of the optic axis of the first light-transmissive substrate 20 and the polarization axis of the polarizing layer 12, and alignment of the optic axis of the second light-transmissive substrate 30 and the polarization axis of the polarizing layer 12 can be made relatively easily.

In the method for manufacturing an optical device according to Exemplary embodiment 2, in the first bonding, the polarizing layer 12 and the first light-transmissive substrate 20 are bonded so that the optic axis of the first light-transmissive substrate 20 and the polarization axis of the polarizing layer 12 become substantially parallel to each other, and that in the second bonding, the polarizing layer 12 and the second light-transmissive substrate 30 are bonded so that the optic axis of the second light-transmissive substrate 30 and the polarization axis of the polarizing layer 12 become substantially parallel to each other. Therefore, unwanted double refraction that occurs when neither the optic axis of the first light-transmissive substrate 20 nor the optic axis of the second light-transmissive substrate 30 is substantially parallel or substantially perpendicular to the polarization axis of the polarizing layer 12, is restrained, enabling manufacture of the optical device 1 of high quality.

In the method for manufacturing an optical device according to Exemplary embodiment 2, the heat treatment is performed on the polarizing layer 12 bonded on the first light-transmissive substrate 20 with the pressure-sensitive-adhesive, and therefore initial contraction due to heat of the polarizing layer 12 occurs. Thus, damage to the polarizing layer 12 due to thermal stress can be prevented even when the manufactured optical device is heated.

In the method for manufacturing an optical device according to Exemplary embodiment 2, an ultraviolet hardening adhesive is used as the adhesive. The second bonding includes casting ultraviolet rays to the adhesive to harden the adhesive. Thus, the excellent optical device 1 as described above can be easily manufactured.

The optical device and the method for manufacturing an optical device according to some aspects of the invention are described above with reference to the exemplary embodiments. However, the invention is not limited to these exemplary embodiments but can be embodied in various forms without departing from the scope of the gist of the invention, and for example, the following modifications can be made.

In the optical device 1 according to Exemplary embodiment 1, sapphire is used as the material of both the first light-transmissive substrate 20 and the second light-transmissive substrate 30. However, the invention is not limited to this. As the material of the light-transmissive substrate and the other light-transmissive substrate, quartz, quartz glass, hard glass, crystalline glass or sintered body of cubic crystal may be used other than sapphire. When quartz is used as the material of the light-transmissive substrate and the other light-transmissive substrate, the similar effect can be achieved as in the case of using sapphire. Also, when quartz glass, hard glass, crystalline glass or sintered body of cubic crystal is used as the material of the light-transmissive substrate and the other light-transmissive substrate, lowering of the quality of light fluxes passing through the light-transmissive substrates can be restrained because little double refraction occurs in the these materials. Moreover since these materials have a relatively small coefficient of thermal expansion, deformation of the polarizer itself can be restrained by adhering the polarizer, which by nature tends to be elongated and deformed by heat, to the light-transmissive substrate and the other light-transmissive substrate made of the materials having such a small coefficient of thermal expansion. When crystalline glass or sintered body of cubic crystal is used as the material of the light-transmissive substrate and the other light-transmissive substrate, if the axial direction having large thermal expansion in the crystalline glass or sintered body of cubic crystal is aligned with the extending direction of the polarizing layer, thermal deformation of the polarizing layer can be restrained. Also, other transparent glasses (for example, white plate glass, Pyrex (trademark registered) and the like), YAG polycrystal, aluminum oxide-nitride and the like can be suitably used as the material of the light-transmissive substrate and the other light-transmissive substrate. In short, an inorganic material suffices as the first light-transmissive substrate 20 and the second light-transmissive substrate 30. As the sintered body of cubic crystal, for example, YAG light-transmissive sintered glass can be used.

In the optical device 1 according to Exemplary embodiment 1, the first light-transmissive substrate 20 and the second light-transmissive substrate 30 are made of the same material, as an exemplary case. However, the invention is not limited to this. For example, one of the first light-transmissive substrate 20 and the second light-transmissive substrate 30 may be made of quartz glass, hard glass or other transparent glasses, and the other light-transmissive substrate may be made of sapphire or quartz.

In the method for manufacturing an optical device according to Exemplary embodiment 2, in the first bonding, the polarizing layer 12 and the first light-transmissive substrate 20 are bonded on each other so that the optic axis of the first light-transmissive substrate 20 and the polarization axis of the polarizing layer 12 become substantially parallel to each other, and in the second bonding, the polarizing layer 12 and the second light-transmissive substrate 30 are bonded on each other so that the optic axis of the first light-transmissive substrate 30 and the polarization axis of the polarizing layer 12 become substantially parallel to each other. However, the invention is not limited to this. It is also preferable that in the first bonding, the polarizing layer 12 and the first light-transmissive substrate 20 are bonded on each other so that the optic axis of the first light-transmissive substrate 20 and the polarization axis of the polarizing layer 12 become substantially perpendicular to each other, and that in the second bonding, the polarizing layer 12 and the second light-transmissive substrate 30 are bonded on each other so that the optic axis of the first light-transmissive substrate 30 and the polarization axis of the polarizing layer 12 become substantially perpendicular to each other.

If one of the first light-transmissive substrate 20 and the second light-transmissive substrate 30 is made of a material having no optic axis, or if both the first light-transmissive substrate 20 and the second light-transmissive substrate 30 are made of a material having no optic axis, the light-transmissive substrate(s) made of the material having no optic axis can be arbitrarily bonded onto the polarizing layer 12.

In the method for manufacturing an optical device according to Exemplary embodiment 2, in the application of the pressure-sensitive-adhesive, the pressure-sensitive-adhesive is applied to one surface of the polarizing layer 12 of the polarizer 10. However, the invention is not limited to this. An adhesive, instead of the pressure-sensitive-adhesive, may be applied thereto.

The priority applications Numbers JP2006-047881 and JP2006-121653 upon which this patent application is based is hereby incorporated by reference.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. An optical device comprising:
   a polarizer having a polarizing layer that consists of triacetylcellulose-free and uniaxially extended polyvinyl alcohol, the polarizing layer absorbing polarized light in a direction parallel to the uniaxially extending direction and transmitting polarized light in a direction perpendicular to the uniaxially extending direction;
   a first light-transmissive substrate bonded on one surface of the polarizing layer of the polarizer by a first bonding material; and
   a second light-transmissive substrate bonded on the other surface of the polarizing layer of the polarizer by a second bonding material;
   the first light-transmissive substrate and the second light-transmissive substrate being made of an inorganic material, and
   the optical device not including an organic material except the polarizing layer, the first bonding material and the second bonding material.

2. The optical device according to claim 1,
   at least one of the first light-transmissive substrate and the second light-transmissive substrate being made of sapphire or quartz.

3. The optical device according to claim 1,
   at least one of the first light-transmissive substrate and the second light-transmissive substrate being made of quartz glass, hard glass or other light-transmissive glasses.

4. The optical device according to claim 1,
   at least one of the first light-transmissive substrate and the second light-transmissive substrate being made of crystalline glass or sintered body of cubic crystal.

5. The optical device according to claim 1,
   at least one of the first light-transmissive substrate and the second light-transmissive substrate being made of a material having an optic axis, and
   the first light-transmissive substrate and the second light-transmissive substrate being arranged with respect to the polarizing layer so that the optic axis of the light-transmissive substrate made of the material having the optic axis is substantially parallel or substantially perpendicular to the polarization axis of the polarizing layer.

6. The optical device according to claim 1,
   the first light-transmissive substrate and the second light-transmissive substrate being made of the same material.

7. A method for manufacturing an optical device including a polarizer having a polarizing layer and a first light-transmissive substrate and a second light-transmissive substrate that are made of an inorganic material having an optic axis, the method comprising:
   applying a pressure-sensitive-adhesive to one surface of the polarizing layer of the polarizer, the polarizing layer consisting of triacetylcellulose-free and uniaxially extended polyvinyl alcohol, the polarizing layer absorbing polarized light in a direction parallel to the uniaxially extending direction and transmitting polarized light in a direction perpendicular to the uniaxially extending direction;
   bonding the one surface of the polarizing layer and the first light-transmissive substrate with the pressure-sensitive-adhesive;
   applying an adhesive to the other surface of the polarizing layer of the polarizer; and
   bonding the other surface of the polarizing layer and the second light-transmissive substrate with the adhesive, in this order,
   the optical device not including an organic material except the polarizing layer, the pressure-sensitive-adhesive and the adhesive.

8. The method for manufacturing an optical device according to claim 7,
   between the bonding the polarizing layer and the first light-transmissive substrate and the application of the adhesive, performing heat treatment for the polarizing layer bonded on the first light-transmissive substrate with the pressure-sensitive-adhesive.

9. The method for manufacturing an optical device according to claim 7,
   in the bonding the polarizing layer and the first light-transmissive substrate, the polarizing layer and the first light-transmissive substrate are bonded so that the optic axis of the first light-transmissive substrate and the polarization axis of the polarizing layer become substantially parallel or substantially perpendicular to each other, and in the bonding the polarizing layer and the second light-transmissive substrate, the polarizing layer and the second light-transmissive substrate are bonded so that the optic axis of the second light-transmissive substrate and the polarization axis of the polarizing layer become substantially parallel or substantially perpendicular to each other.

10. The method for manufacturing an optical device according to claim 7, an ultraviolet hardening adhesive being used as the adhesive, and in the bonding the polarizing layer and the second light-transmissive substrate, casting ultraviolet rays to the adhesive to harden the adhesive.

11. The optical device according to claim 1, the materials of the first and second light-transmissive substrates having a smaller coefficient of thermal expansion than that of the polarizer.

12. The optical device according to claim 1, at least one of the first and second light-transmissive substrates being made of a material having no optic axis.

13. The method for manufacturing an optical device according to claim 7, the materials of the first and second light-transmissive substrates having a smaller coefficient of thermal expansion than that of the polarizer.

14. The method for manufacturing an optical device according to claim 7, at least one of the first and second light-transmissive substrates being made of a material having no optic axis.

* * * * *